UNITED STATES PATENT OFFICE.

DITTMAR FINKLER, OF BONN, GERMANY.

METHOD OF OBTAINING ALBUMEN.

SPECIFICATION forming part of Letters Patent No. 567,706, dated September 15, 1896.

Application filed October 21, 1895. Serial No. 566,401. (No specimens.)

*To all whom it may concern:*

Be it known that I, DITTMAR FINKLER, a subject of the Emperor of Germany, residing at Bonn-on-the-Rhine, Germany, have invented certain new and useful Improvements in the Art of Obtaining Albumen from Albuminous Substances; and I do hereby declare the following to be a full, clear, and exact description of the invention, such as will enable others skilled in the art to which it appertains to make and use the same.

My invention has relation to the art of obtaining albumen from animal and vegetable substances or mixtures and products; and it consists in a process of obtaining the albumen in a form suitable for consumption as a nutritive substance freed from those constituents which affect the senses of taste and smell, not liable to deteriorate, and readily digested.

I am aware that it is not new to extract the albumen from substances such as referred to, and particularly from blood, by extracting the same from the coagulated blood and freeing the albuminous extract as much as possible from coloring-matter and other undesirable constituents, as hematin, and then bleaching the purified albumen by means of a suitable bleaching agent, as peroxid of hydrogen. Such a process implies two distinct steps, namely, the extraction and the subsequent bleaching of the extract.

My invention has for its object a simpler process involving a novel mode of procedure, in that the undesirable constituents of the albuminous bodies are decomposed without, of course, decomposing the albumen, and converted into substances or bodies readily soluble, hence readily removable from the albumen, whereby the process of bleaching is dispensed with. To this end the albuminous substance is subjected, in accordance with my invention, to far-reaching changes, such as are produced by oxygen and hydrogen *in statu nascendi* or by acids or lyes. Chemical reactions are produced in the liquids containing the albuminous materials, due to the liberated oxygen or hydrogen, or both, which attack the albuminous mixture and decompose the undesirable constituents thereof to a greater or less extent, the reactions taking place in the simplest manner in the presence of peroxid of hydrogen and heat; yet, in so far as the principle of my invention is concerned, it is immaterial whether the reaction or decomposition is effected by means of peroxid of hydrogen or equivalent reagents or by the electrolytical decomposition of water. After extraction and washing the albumen is in a condition for consumption, free from coloring-matter, as well as ill-smelling and ill-tasting constituents, thereby avoiding a further purification and the subsequent bleaching heretofore necessary, as described, for instance, in the German patents of Cosineru, Nos. 63,353 and 65,703.

In carrying out my invention I may proceed as follows: In the extraction of albumen from blood the latter is mixed with a solution of common salt in the proportion of about one per cent., so that a thin film or layer of the liquid will be transparent, to which is then added a ten-per-cent. solution of peroxid of hydrogen in proportion of from one to five parts of the latter to five parts of the blood, the whole being then heated to the boiling-point, whereby the hematin and hemoglobin are converted into urobilin and similar coloring-matter. The action of the peroxid of hydrogen not only decomposes the coloring-matter, but also the ill-smelling and ill-tasting constituents of the blood, such as fats, soaps, and fatty acids, the bacteria are killed, and the products resulting from the conversion or changes of constituent substances are also decomposed, and the albumen simultaneously coagulated, so that the different products of decomposition can be readily removed from the coagulated albumen by washing the latter in water. If necessary, lixiviation in alcohol, benzene, sulfid of carbon, &c., may be resorted to.

In order to avoid the decomposition of the albumen, it is necessary that the peroxid of hydrogen should not be too concentrated, and the temperature under which the reaction takes place should neither be too high nor of too great a duration.

Theoretically speaking, it is doubtful whether the oxygen or both the oxygen and hydrogen enter into action. Practically speaking, both elements produce the desired reaction. For instance, if oxygen is developed from peroxid of manganese or from potassium chlorate, the described decomposition proceeds; also if zinc and an acid, as hydrochloric or sulfuric acid, are caused to act upon each other; but the use of such means for carrying out my invention is perhaps not simple enough. On the other hand, phosphoric acid in the proportion of one to five per cent. may be added to the blood-lye, or the latter may be boiled with from one to ten per cent. of hydrochloric acid or sulfuric acid and the described reaction effected. This may also be done by means of phosphorous or sulfurous acids, or by boiling with potash and other lyes in the proportion of from one to five per cent. I prefer, however, to use peroxid of hydrogen, for the reason that the use of the other substances described involves great care in order to avoid the decomposition of the albumen, which takes place readily, in part at least, or the formation of alkali albuminates, which necessitates the subsequent conversion of the latter into albuminates in a well-known manner. Furthermore, the peroxid of hydrogen acts more powerfully and more rapidly upon the coloring-matter and the ill-smelling and ill-tasting constituents.

If peroxid of hydrogen is used in such manner that equal parts of a ten-per-cent. solution of the latter and of blood are heated to the boiling-point, nearly the whole of the albumen in the blood remains undecomposed. Of course if a greater quantity or stronger peroxid-of-hydrogen solution is used more or less of the albumen is decomposed.

In the above-described process the undesirable constituents, combined or mixed with the albumen, as coloring-matter, toxin, bacteria, and the ill-smelling and ill-tasting substances, are decomposed and converted into bodies that are readily washed out with water, while the albumen itself remains unaffected.

The described reactions and simple mode of producing the same were of course not known to Cosineru, as the tenor of the description of his invention plainly indicates, so that according to his processes it became necessary to remove the hematin and hemoglobin before bleaching the final product, all of which I accomplish by the use of a suitable reagent, preferably peroxid of hydrogen and heat, whereby the destruction of the coloring-matter, the decomposition of the ill-smelling and ill-tasting constituents, and the disinfection are simultaneously effected.

When albumen is to be obtained from fish or flesh in the form of flour, or from refuse flesh and other like materials, the glue and the glue-yielding constituents, as well as certain salts, are preferably first washed out, for which purpose attenuated acid solutions or lyes are used, according to the nature of the raw material, while more or less of the fatty constituents may also be extracted, the agents to be used being of such a nature as not to affect the albumen, so that a coagulation or swelling up of the latter, as described in German Patent No. 77,292, does not take place, the material being then in a better condition for the conversion of those undesirable constituents hereinbefore referred to. This is effected, as stated, by oxidation and reduction by means of ozone, peroxid of hydrogen, or the like in proper proportions and of the proper concentration at a suitable temperature and for a proper length of time, during which the described decomposition and changes take place, so that by a simple process of washing with water or alcohol or other solvents, as, for instance, soap solutions, the products of decomposition can be removed from the albumen.

The albuminous substances are thus obtained in the form of yellow to gray and brown pulverulent masses, which when dried are substantially inodorous and tasteless, and consist almost exclusively of pure albumen, containing perhaps a small percentage of harmless salts. Of course the greater the percentage of albumen in the final product the better, and this percentage may by my process attain one hundred per cent. The final product is nutritive, appetizing, and digestible, and is not detrimental to health.

The mode of carrying out my invention will now be specifically described, taking the treatment of blood and meat meal or flour as examples.

First. One hundred cubic centimeters of blood are mixed with sufficient water to dissolve the blood-corpuscles, or so that a thin layer or film of the liquid will be transparent; otherwise the blood-corpuscles would decompose peroxid of hydrogen, and thus leave the coloring-matter undecomposed. To this mixture I add from one to five grams common salt and from twenty to one hundred cubic centimeters of a ten-per-cent. solution of peroxid of hydrogen, the mixture being then heated to the boiling-point and boiled. On the other hand, I may heat the mixture of blood, water, and common salt to coagulate the blood, whereby the albuminous constituents are precipitated in the form of a darkly-colored soft fine powder. The liquid is then removed, as, for instance, in a filter-press, and the powder mixed with fresh water, to which is added peroxid of hydrogen in the proportions above stated, the mixture being then heated to the boiling-point and boiled. The residue, which has become solid during the boiling process, and which consists of albumen, is separated from the liquid and dried ready for use.

Second. Meat-flour is mixed with about five times its volume of water and boiled, and, according to the nature of the flour, from 0.1 to one per cent. of hydrochloric acid may be added for the purpose of dissolving the glue and the glue-yielding constituents as well as for dissolving various salts. The residue is separated from the liquid, again mixed with five times its volume of water and with peroxid of hydrogen in the proportion of about one part of a ten-per-cent. solution of the latter to one part of meat-flour, the mixture being then boiled for about half an hour. After boiling, the solid constituents are separated from the liquid and washed one or more times in hot water and then dried. Should the dried product not be inodorous and tasteless, the cause of which is due to the presence of soaps and fatty acids, these may be readily removed by means of alcohol or ether or benzene or carbon sulfid. The wash-liquors do not contain blood dyestuffs, but the products of decomposition thereof up to urobilin, besides fats and fatty acids, which latter may be extracted by means of suitable solvents, as ether, and removed, together with other ill-smelling and ill-tasting constituents, by evaporation of the solvent. It is not possible to remove these constituents by lixiviation unless the reagent, as the peroxid of hydrogen, is employed in about the proportions set forth. A portion of the fatty constituents is decomposed by the peroxid or hydrogen under formation of carbonic acid.

In the treatment of meat-flour rich in fat the latter may first be saponified by treating the flour with a suitable alkali lye, as a potash or soda lye, in the proportion of about 0.1 per cent., so that the saponified fat can then be almost entirely washed out, after which the material is treated with peroxid of hydrogen, as described. For the lixiviation of the final product from meat-flour I prefer a neutral soap solution, the remainders of which are finally removed from the albumen by means of alcohol.

Having thus descried my invention, what I claim as new therein, and desire to secure by Letters Patent, is—

1. The herein-described process of obtaining albumen from bodies or substances containing the same, which consists in chemically decomposing as by oxidation or reduction, the undesirable constituents combined or mixed with the albumen by boiling the albuminous substance with a suitable reagent as peroxid of hydrogen.

2. The herein-described process of obtaining albumen from bodies or substances containing the same, which consists in chemically decomposing as by oxidation or reduction, the undesirable constituents combined or mixed with the albumen by boiling the albuminous substance with a suitable reagent as peroxid of hydrogen in such proportion and for such a length of time as to leave substantially the whole of the albumen unaffected, and then leaching out the soluble products resulting from such decomposition.

3. The herein-described process of obtaining albumen from fatty albuminous substances, which consists in first saponifying the fatty constituents, washing out the product of saponification, decomposing the other undesirable constituents by boiling the albuminous substance with a suitable reagent as peroxid of hydrogen, and washing out the products of decomposition with a neutral soap solution.

4. The herein-described process of obtaining albumen from fatty albuminous substances, which consists in first saponifying the fatty constituents, washing out the product of saponification, decomposing the other undesirable constituents by boiling the albuminous substance with a suitable reagent as peroxid of hydrogen, and washing out the products of decomposition with a neutral soap solution, separating the albumen from the soap solution and removing any traces of the latter by means of alcohol.

In testimony that I claim the foregoing as my invention I have signed my name in presence of two subscribing witnesses.

DITTMAR FINKLER.

Witnesses:
SOPHIE NAGEL,
WILLIAM H. MADDEN.